United States Patent
Bueno

(10) Patent No.: US 11,157,655 B2
(45) Date of Patent: Oct. 26, 2021

(54) DETERMINING VEHICLE DATA INTEGRITY

(71) Applicant: Woven Planet North America, Inc., Los Altos, CA (US)

(72) Inventor: Carlos Manuel Bueno, San Francisco, CA (US)

(73) Assignee: Woven Planet North America, Inc., Los Altos, CA (US)

( * ) Notice: Subject to any disclaimer, the term of this patent is extended or adjusted under 35 U.S.C. 154(b) by 270 days.

(21) Appl. No.: 16/236,865

(22) Filed: Dec. 31, 2018

(65) Prior Publication Data

US 2020/0210623 A1  Jul. 2, 2020

(51) Int. Cl.
| | |
|---|---|
| *H04L 9/06* | (2006.01) |
| *H04L 9/32* | (2006.01) |
| *G06F 21/60* | (2013.01) |
| *G06F 16/23* | (2019.01) |
| *G06F 21/64* | (2013.01) |
| *H04L 9/30* | (2006.01) |

(52) U.S. Cl.
CPC .......... *G06F 21/64* (2013.01); *G06F 16/2365* (2019.01); *G06F 21/602* (2013.01); *H04L 9/0637* (2013.01); *H04L 9/0643* (2013.01); *H04L 9/30* (2013.01); *H04L 9/3242* (2013.01); *H04L 9/3247* (2013.01); *H04L 2209/38* (2013.01)

(58) Field of Classification Search
CPC .... G06F 21/64; G06F 21/602; G06F 16/2365; H04L 2209/38; H04L 2209/84; H04L 9/0643; H04L 9/0637; H04L 9/3247; H04L 9/3242; H04L 9/30; H04L 9/3239
See application file for complete search history.

(56) References Cited

U.S. PATENT DOCUMENTS

| | | | |
|---|---|---|---|
| 10,185,595 B1* | 1/2019 | Ramatchandirane | ....................... G06F 9/5061 |
| 2017/0346693 A1* | 11/2017 | Dix | ........ H04L 9/3265 |
| 2018/0096360 A1* | 4/2018 | Christidis | .............. G06Q 20/02 |
| 2018/0374283 A1* | 12/2018 | Pickover | ................ G07C 5/085 |
| 2020/0162263 A1* | 5/2020 | Iyer | ....................... H04L 9/3236 |

\* cited by examiner

*Primary Examiner* — Alexander Lagor
*Assistant Examiner* — Vu V Tran
(74) *Attorney, Agent, or Firm* — Christopher G. Darrow; Darrow Mustafa PC

(57) ABSTRACT

Systems, methods, and non-transitory computer-readable media can obtain and verify a hash chain. A hash chain can comprise at least a first data block and a second data block. The first data block can include a first portion of a stream of vehicle data. The second data block can include a second portion of the stream of vehicle data and a hash value of the first data block. Verification of whether the hash chain is authentic can be based at least in part on the hash value of the first data block.

20 Claims, 10 Drawing Sheets

DETERMINING VEHICLE DATA INTEGRITY

FIELD OF THE INVENTION

The present technology relates to the field of vehicles. More particularly, the present technology relates to systems, apparatus, and methods for storing and verifying the integrity of data stored by vehicles.

BACKGROUND

Vehicles are increasingly being equipped with intelligent features that allow them to monitor their surroundings and make informed decisions on how to react. Such vehicles, whether autonomously, semi-autonomously, or manually driven, may be capable of sensing their environment and navigating with little or no human input. The vehicle may include a variety of systems and subsystems for enabling the vehicle to determine its surroundings so that it may safely navigate to target destinations or assist a human driver, if one is present, with doing the same. As one example, the vehicle may have a computing system (e.g., one or more central processing units, graphical processing units, memory, storage, etc.) for controlling various operations of the vehicle, such as driving and navigating. To that end, the computing system may process data from one or more sensors. For example, an autonomous vehicle may have optical cameras for recognizing hazards, roads, lane markings, traffic signals, and the like. Data from sensors may be used to, for example, safely drive the vehicle, activate certain safety features (e.g., automatic braking), and generate alerts about potential hazards.

SUMMARY

Various embodiments of the present technology can include systems, methods, and non-transitory computer readable media configured to obtain and verify a hash chain. A hash chain can comprise at least a first data block and a second data block. The first data block can include a first portion of a stream of vehicle data. The second data block can include a second portion of the stream of vehicle data and a hash value of the first data block. Verification of whether the hash chain is authentic can be based at least in part on the hash value of the first data block.

In an embodiment, the obtaining the hash chain comprises obtaining the stream of vehicle data, generating the first data block based on the first portion of the stream of vehicle data, generating the hash value of the first data block, and generating the second data block based on the second portion of the stream of vehicle data and the hash value of the first data block.

In an embodiment, the obtaining the hash chain further comprises determining a computed hash value of the first data block, comparing the computed hash value of the first data block and the hash value of the first data block stored in the second data block, and generating an error upon determining the computed hash of the first data block and the hash value of the first data block stored in the second data block do not match.

In an embodiment, the verifying whether the hash chain is authentic comprises determining a computed hash value of the first data block, comparing the computed hash value of the first data block with the hash value of the first data block stored in the second data block, and verifying the authenticity of the hash chain based on the comparing.

In an embodiment, the verifying whether the hash chain is authentic further comprises determining that the computed hash value of the first data block matches the hash value of the first data block stored in the second data block.

In an embodiment, the hash value of the first data block is stored in a header of the second data block.

In an embodiment, the hash value of the first data block is associated with a digital signature based on application of a cryptographic key to the hash value of the first data block.

In an embodiment, the authenticity of the hash value of the first data block is confirmed by verifying the digital signature.

In an embodiment, the digital signature is generated by applying a private key, and the authenticity of the digital signature is confirmed by applying a public key associated with the private key.

In an embodiment, the stream of vehicle data comprises data generated from at least one of: one or more computing systems associated with a vehicle, an optical camera, a Light Detection And Ranging (LiDAR) sensor, an inertial measurement unit (IMU), a radar sensor, an infrared camera, and an ultrasonic sensor.

It should be appreciated that many other features, applications, embodiments, and variations of the disclosed technology will be apparent from the accompanying drawings and from the following detailed description. Additional and alternative implementations of the structures, systems, non-transitory computer readable media, and methods described herein can be employed without departing from the principles of the disclosed technology.

Figure 1:
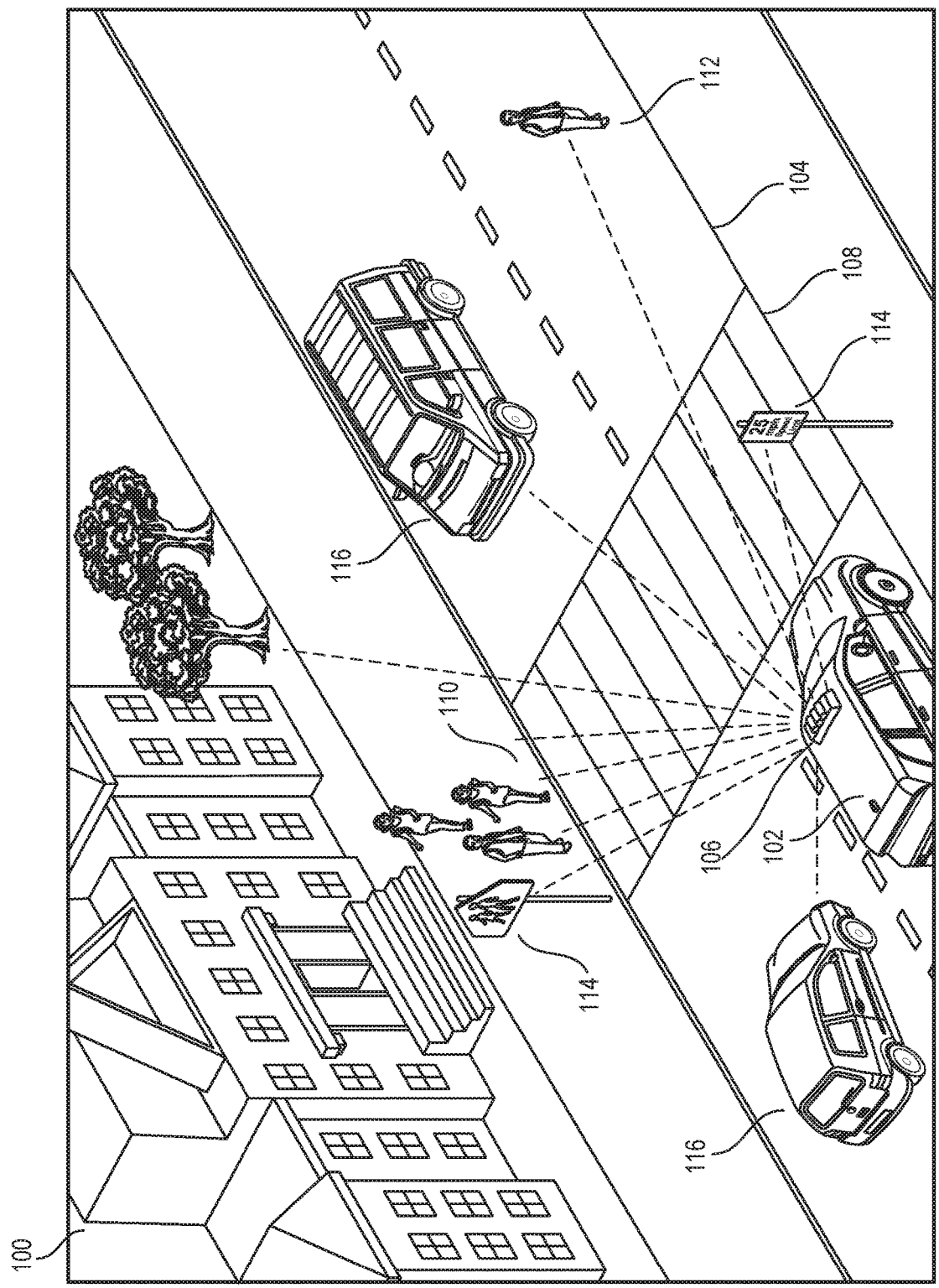
FIG. 1 illustrates a vehicle recording and storing data, according to an embodiment of the present technology.

The figures depict various embodiments of the disclosed technology for purposes of illustration only, wherein the figures use like reference numerals to identify like elements. One skilled in the art will readily recognize from the following discussion that alternative embodiments of the structures and methods illustrated in the figures can be employed without departing from the principles of the disclosed technology described herein.

DETAILED DESCRIPTION

Vehicles are increasingly being equipped with intelligent features that allow them to monitor their surroundings and make informed decisions on how to react. Such vehicles, whether autonomously, semi-autonomously, or manually driven, may be capable of sensing their environment and navigating with little or no human input. The vehicle may include a variety of systems and subsystems for enabling the vehicle to determine its surroundings so that it may safely navigate to target destinations or assist a human driver, if one is present, with doing the same. As one example, the vehicle may have a computing system for controlling various operations of the vehicle, such as driving and navigating. To that end, the computing system may process data from one or more sensors. For example, an autonomous vehicle may have optical cameras for recognizing hazards, roads, lane markings, traffic signals, and the like. Data from sensors may be used to, for example, safely drive the vehicle, activate certain safety features (e.g., automatic braking), and generate alerts about potential hazards.

Autonomous, semi-autonomous, or manually-driven vehicles may be used by a transportation management system to provide ride services or other types of services. A transportation management system may comprise a fleet of such vehicles. Each vehicle in the fleet may include one or more sensors in a sensor suite. When traveling on a given road, a computing system in a vehicle can continually capture and process data from one or more sensors in the vehicle, for example, to identify other vehicles, objects, and potential hazards such as fallen debris, jaywalkers, slick road surfaces, and the like.

Figure 6:
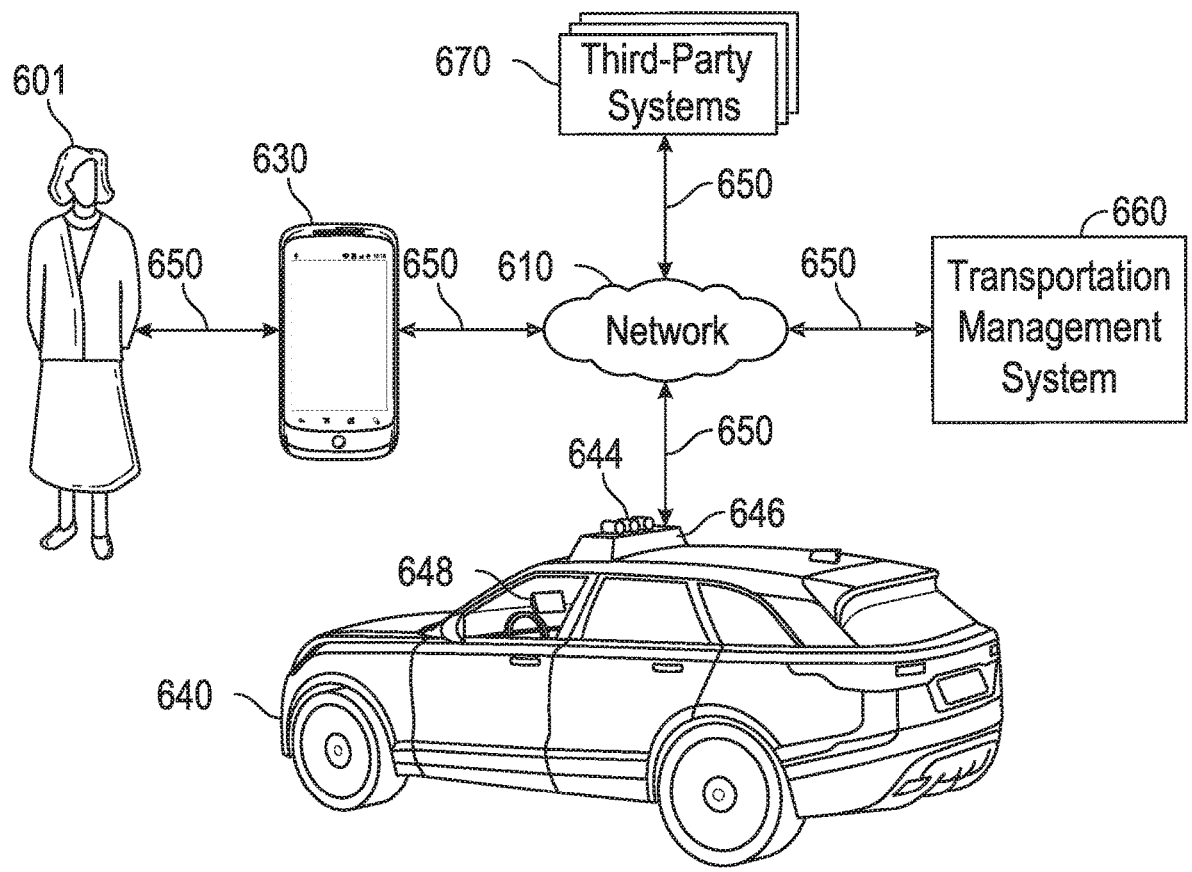
FIG. 6 illustrates an example block diagram of a transportation management environment, according to an embodiment of the present technology.

FIG. 1 illustrates an example environment 100 in which a vehicle 102 can collect a variety of data including sensor data. The vehicle 102 can be, for example, a vehicle 640 as shown in FIG. 6. In FIG. 1, the vehicle 102 is navigating a road 104. The vehicle 102 includes a sensor suite 106, which may include one or more sensors, that can be used to sense static (or stationary) objects, dynamic objects, semi-permanent (or ephemeral) objects that are around (or within some threshold proximity of) the vehicle 102, and environmental information, such as information describing the road 104. For example, the sensor suite 106 may include optical cameras, LiDAR, radar, infrared cameras, and ultrasound equipment, to name some examples. These sensors can be used to collect sensor data that can be used by the vehicle 102 to understand environmental conditions of a given road to permit safe and effective navigation of the road. For instance, sensors in the sensor suite 106 can be used to recognize a crosswalk 108, children 110 waiting to use the crosswalk 108, a pedestrian 112 jaywalking across the road 104, street signs 114, other vehicles 116 present on the road 104, and any other objects that are present. In addition to identifying objects, the sensors in the sensor suite 106 can also be used to monitor the identified objects. For example, once an object is identified, the sensors can be used to trace (or track) a path (or trajectory) of the object over time. Information collected by the sensors in the sensor suite 106 can be used to determine other descriptive features for the road 104. For example, such information can be used to determine road features describing the road 104, such as a length of the road 104 and a road quality of the road 104. In another example, the information can be used to determine contextual features describing the road 104, such as when the information was collected by the sensors in the sensor suite 106 (e.g., time of day, day, etc.) and weather conditions experienced while the information was collected by the sensors in the sensor suite 106. In some instances, rather than or in addition to having a sensor suite, a vehicle may be equipped with a computing device that includes a number of integrated sensors. In such instances, sensors in the computing device can collect information that can be used by the vehicle to understand and navigate a given environment. For example, a mobile computing device (e.g., phone) placed inside of the vehicle 102 may include integrated sensors (e.g., a global positioning system (GPS), optical camera, compass, gyroscope(s), accelerometer(s), and inertial measurement unit(s)) which can be used to capture information and determine features for the road 104.

In general, vehicle data may need to be stored by the vehicle 102 for various reasons. For example, the vehicle data may need to be stored if data relating to operation of the vehicle 102 or associated environmental data is required for later analysis. For instance, the operational history of the vehicle 102 may need to be analyzed at a later date to assess its interactions with other vehicles. In another example, vehicle data generated by the vehicle 102 while navigating autonomously may need to be stored to create a driving record for the vehicle 102. For example, the vehicle data can include data generated by one or more computing systems associated with the vehicle 102 (e.g., an array of sensors 644, a navigation system 646, a ride-service computing device 648, etc.). The vehicle data can, therefore, provide investigators with relevant details about the vehicle 102 and the environment 100 being navigated if the vehicle 102 is involved in a driving incident. Under conventional approaches, a mechanical recording device (or "black box") can be used to record and store vehicle data, such as sensor data. Such conventional mechanical devices pose a number of disadvantages. For example, although conventional mechanical recording devices are capable of recording data, these devices are typically unable to confirm the authenticity of recorded data. In other words, there is typically no means to ensure that data recorded by a mechanical recording device has not been altered, whether intentionally or unintentionally. The ability to confirm the authenticity of recorded data without human input is especially relevant to autonomous vehicles, for example, since a driver is typically not likely to be available to provide details describing driving incidents involving the autonomous vehicles. Mechanical recording devices can also be limited in their bandwidth and storage capabilities. Accordingly, conventional approaches for recording vehicle data pose disadvantages in addressing these and other problems.

An improved approach in accordance with the present technology overcomes the foregoing and other disadvantages associated with conventional approaches. The improved approach may include approaches for storing data and confirming an authenticity of stored data. For example, in various embodiments, a hash chain can be used to store various types of data including, for example, sensor data captured by a vehicle. The hash chain can be composed of a series of linked data blocks. Each data block can correspond to some portion of data (e.g., vehicle data, sensor data, etc.) being stored in the hash chain. In some embodiments, a pair of data blocks in the hash chain can be linked based on a hash value generated using a cryptographic hash function. For example, when linking a first data block and a subsequent second data block, a hash value for the first data block can be generated using a cryptographic hash function. In this example, the hash value generated for the first data block can be stored in the subsequent second data block. For instance, the first data block can be provided as input to a cryptographic hash function (e.g., a Secure Hash Algorithm) which then outputs a hash value (e.g., an alphanumeric string). The outputted hash value generally depends on the contents of the first data block. As a result, if the contents of the first data block are altered, the cryptographic hash function, when applied to the altered first data block, would typically output a hash value for the first data block that is different from the original hash value. In some embodiments, data blocks in the hash chain can be authenticated based on stored hash values. In the foregoing example, an authenticity of the first data block can be determined by generating a new hash value of the first data block using the same cryptographic hash function. The new hash value is then compared to the hash value of the first data block stored in the second data block. If the two hash values match, then a determination can be made that the first data block has not been altered. If, however, the new hash value and the stored hash value do not match, then the contents of the first data block have likely been corrupted or otherwise altered. The use of hash chains to store and manage vehicle data provides a number of advantages. For example, an autonomous vehicle can continuously store vehicle data in a hash chain. If the autonomous vehicle becomes involved in a driving incident, the last recorded data block(s) can correspond to the most recently stored vehicle data prior to the incident. By verifying the authenticity of the last recorded data blocks based on the present technology, a validated record of what occurred prior to the incident can be reviewed. At the time of the incident, the autonomous vehicle may not have a human driver or passenger who can provide a detailed recollection of the incident. Accordingly, the validated record may provide valuable information related to what occurred prior to the incident. Thus, it would be advantageous to be able to verify the authenticity of the validated record based on the present technology. More details relating to the present technology are provided below.

Figure 2:
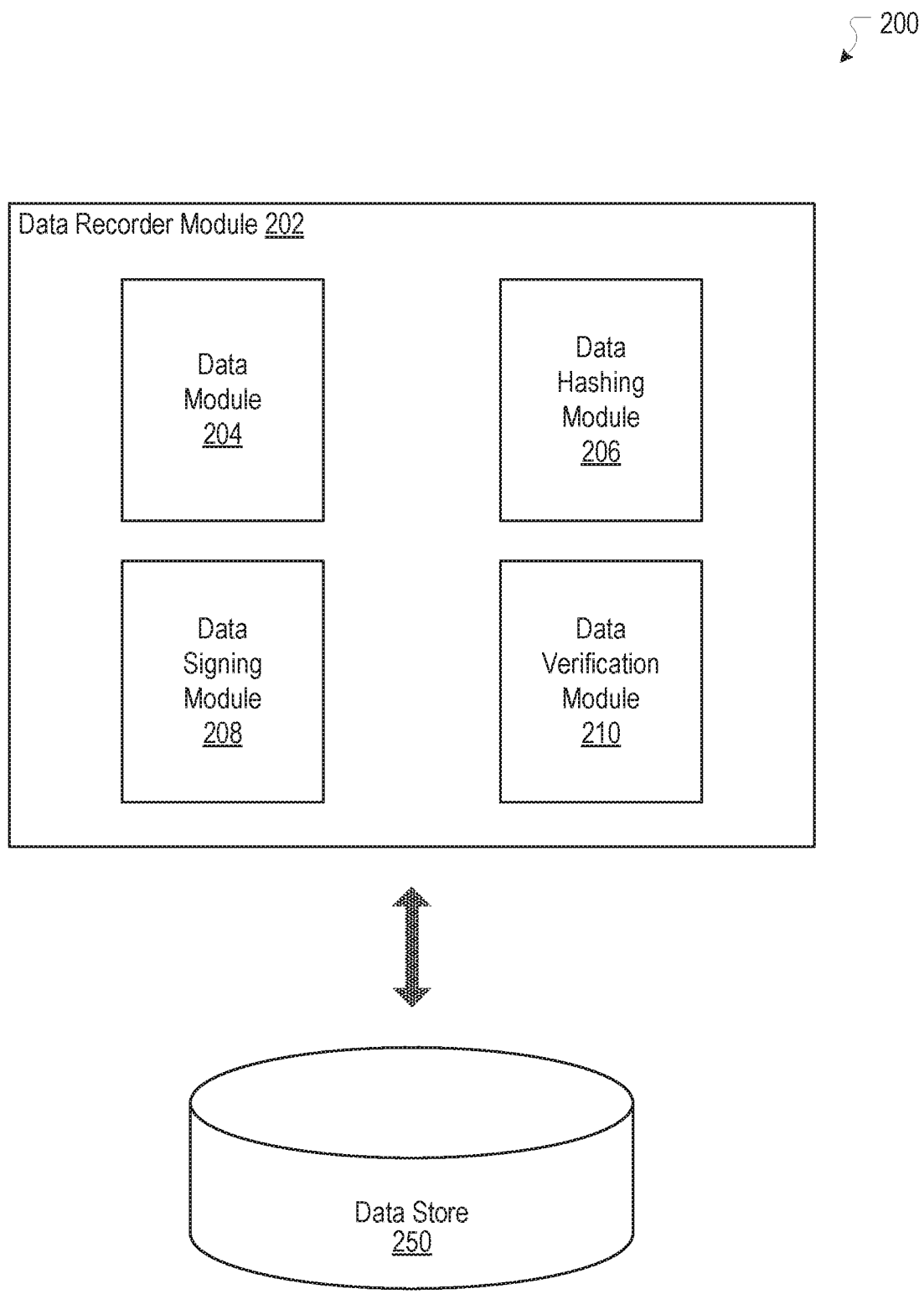
FIG. 2 illustrates an example data recorder module, according to an embodiment of the present technology.

FIG. 2 illustrates an example system 200 including an example data recorder module 202, according to an embodiment of the present technology. As shown in the example of FIG. 2, the data recorder module 202 can include a data module 204, a data hashing module 206, a data signing module 208, and a data verification module 210. In some instances, the example system 200 can include at least one data store 250. The components (e.g., modules, elements, etc.) shown in this figure and all figures herein are exemplary only, and other implementations may include additional, fewer, integrated, or different components. Some components may not be shown so as not to obscure relevant details. In some embodiments, some or all data stored in the data store 250 can be maintained by a vehicle, such as the vehicle 640 of FIG. 6. In some embodiments, some or all data stored in the data store 250 can be maintained by a transportation management system 660 of FIG. 6. In some embodiments, some or all of the functionality performed by the data recorder module 202 and its sub-modules may be performed by one or more computing systems implemented in a vehicle, such as the vehicle 640 of FIG. 6. In some embodiments, some or all of the functionality performed by the data recorder module 202 and its sub-modules may be performed by one or more backend computing systems, such as the transportation management system 660 of FIG. 6.

The data recorder module 202 can be configured to communicate and operate with the at least one data store 250, as shown in the example system 200. The at least one data store 250 can be configured to store and maintain various types of data. The data can include any type of data relating to operation of a vehicle or environmental information associated with the vehicle. For example, the data store 250 can store information describing sensor data and related information such as timestamps indicating when sensor data was collected and geographic locations from where the sensor data was collected. In some embodiments, the data store 250 can store manual or automated commands provided by an autonomous, semi-autonomous, or manually driven vehicle while navigating roads.

The data module 204 can be configured to generate respective data blocks for a hash chain from data streams produced by a vehicle (e.g., the vehicle 640 of FIG. 6). For example, in some embodiments, the data module 204 can generate data blocks from a stream of sensor data that is produced by one or more sensors in a vehicle. For example, in some embodiments, sensors in the vehicle can produce respective data streams as the vehicle navigates or is stopped in a geographic region. For example, optical cameras associated with the vehicle can output a data stream of image data that is captured while the vehicle is navigating the geographic region. In another example, a LiDAR unit associated with the vehicle can output a data stream of LiDAR data that is generated while the vehicle is navigating the geographic region. In various embodiments, data blocks generated from a data stream can be used to construct one or more hash chains for storing and authenticating data. In some embodiments, the generated data blocks each correspond (or substantially correspond) to a predefined size. For example, a data stream may produce 120 kilobytes of data. In this example, the data module 204 can generate three data blocks that are each 40 kilobytes in size. In other embodiments, the data blocks can be variable in size.

Data blocks can be generated using various approaches. For example, in some embodiments, the data module 204 can generate data blocks for a hash chain based on segments of time (e.g., 5 seconds, 1 minute, etc.). For example, each data block can correspond to sensor data captured at 5-second intervals. In this example, if an incident involving the vehicle occurs, the last recorded data block corresponds with the last 5 seconds of sensor data prior to the incident. In some embodiments, a hash chain is limited to a fixed number of data blocks (e.g., 100 data blocks, 1,000 data blocks, etc.). In such embodiments, once the fixed number of data blocks is reached, the data module 204 can include subsequent data blocks in a new hash chain. In general, data blocks for a hash chain can be generated from any type of data that may be recorded by a vehicle or computing device (e.g., mobile phone). For example, in some embodiments, a driver-operated vehicle may include a computing device (e.g., mobile phone) that includes one or more integrated sensors that can be used to capture information. In this example, the data module 204 can generate data blocks from sensor data produced by the computing device. These data blocks can then be linked to form a hash chain. More details describing the linking of data blocks are provided below.

The data hashing module 206 can be configured to link data blocks to be included in a hash chain. In some embodiments, a pair of data blocks are linked based on hash values generated using a cryptographic hash function. For example, the data hashing module 206 can receive data blocks from the data module 204. The data hashing module 206 can generate a corresponding hash value for each data block based on a generally known cryptographic hash function (e.g., a Secure Hash Algorithm). In this example, a hash value for a data block can be included in a subsequent data block, thereby establishing a link between the data block and the subsequent data block. For example, a first data block in the hash chain can be linked to a subsequent second data block by generating a hash value for the first data block using a cryptographic hash function and storing the generated hash value in the second data block. For example, the first data block can be provided as input to a cryptographic hash function which then outputs a corresponding hash value (e.g., an alphanumeric string) based on the contents of the first data block. This outputted hash value for the first data block can be stored in the second data block. In some embodiments, the data hashing module 206 can include the hash value for the first data block in a file header of the second data block. Similarly, the second data block can be provided as input to the cryptographic hash function which then outputs a corresponding hash value based on the contents of the second data block. This outputted hash value for the second data block can be stored in a third data block in the hash chain. For example, the data hashing module 206 can include the hash value for the second data block in a file header of the third data block. Such linking of data blocks can continue as additional data blocks are generated for the hash chain. The foregoing example illustrates generating a hash value from a data block and including the hash value in a subsequent data block to link the data block and the subsequent data block for purposes of constructing a hash chain.

In some embodiments, hash values generated for data blocks can be cryptographically signed to provide another measure of authenticity. For example, in some embodiments, the data signing module 208 can cryptographically sign hash values generated by the data hashing module 206 with a key. In some embodiments, the data signing module 208 can be configured to cryptographically sign hash values using a symmetric key. In such embodiments, the symmetric key is also used to verify the cryptographically signed hash value. In other embodiments, the data signing module 208 can be configured to generate a private key and corresponding public key. In such embodiments, the data signing module 208 can produce a digital signature based on application of the private key to a hash value. Further, the corresponding public key can be applied to the signed hash value to verify an authenticity of the hash value. For example, the data signing module 208 can apply a private key to cryptographically sign a hash value generated from a first data block. The cryptographically signed hash value can be included in a second data block as a hash chain is constructed. In this example, the cryptographically signed hash value can be verified using a public key associated with the private key to ensure the hash value has not been altered. In some embodiments, the data signing module 208 can be configured to generate a cryptographic signature which includes a timestamp. By doing so, it can be verified that a hash value is not only authentic, but also that the hash value was generated at the time a hash chain including the hash value was constructed. For example, a hash value can be generated from a data block corresponding to a segment of time from 14:00:00 to 14:00:05. The hash value can be cryptographically signed based on the hash value and the time the hash value was generated (14:00:05). When the hash value is verified, it can be determined that not only is the hash value authentic, but also that it was generated at 14:00:05. In some embodiments, the data signing module 208 can be configured to cryptographically sign a hash value for only a first data block (e.g., a genesis block) in a hash chain. In some embodiments, the data signing module 208 can be configured to cryptographically sign hash values for data blocks in a hash chain at periodic intervals. The periodic intervals can be based on a selected number or a selected time. For example, every 10th hash value can be cryptographically signed, or a hash value can be cryptographically signed every 8 minutes. In some embodiments, the data signing module 208 can be configured to cryptographically sign hash values for data blocks in a hash chain intermittently based on, for example, an availability of resources. For example, in a system with limited resources, a hash value can be cryptographically signed when the process of signing would not interfere with or delay the capturing and storing of sensor data. In some embodiments, the data signing module 208 can be configured to cryptographically sign each hash value in a hash chain. Many variations are possible.

The data verification module 210 can be configured to verify that data stored in a hash chain is authentic (e.g., unaltered). For example, a hash chain can include a first data block and a second data block. A hash value of the first data block can be included in the second data block. In this example, the data verification module 210 can calculate a hash value for the first data block. The calculated hash value can be compared with the hash value of the first data block stored in the second data block. If the calculated hash value and the hash value stored in the second data block match, then the data verification module 210 can verify that the data in the first data block has not been altered. More details regarding the data verification module 210 will be provided below with reference to FIG. 3.

Figure 3:
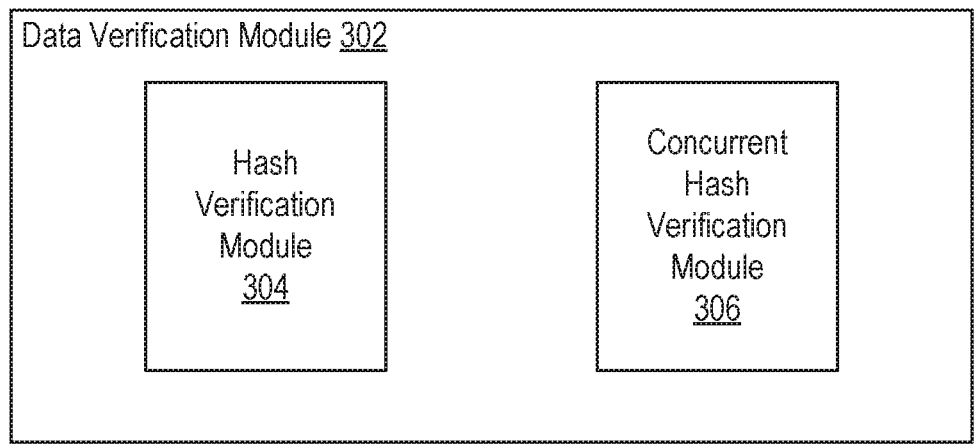
FIG. 3 illustrates an example data verification module, according to an embodiment of the present technology.

FIG. 3 illustrates an example data verification module 302, according to an embodiment of the present technology. In some embodiments, the data verification module 210 of FIG. 2 can be implemented with the data verification module 302. As shown in the example of FIG. 3, the data verification module 302 can include a hash verification module 304 and a concurrent hash verification module 306.

The hash verification module 304 can be configured to verify an authenticity of a data block in a hash chain. In some embodiments, the hash verification module 304 can verify a data block in a hash chain by comparing a new hash value of the data block with a hash value of the data block stored in a subsequent data block in the hash chain. The new hash value for the data block can be determined using the same cryptographic hash function that was used to generate the hash value of the data block stored in the subsequent data block. If the new hash value matches the stored hash value, then authenticity of the data block is confirmed. For example, the hash verification module 304 can compute a new hash value (e.g., "1A3F") based on a first data block in a hash chain. The hash verification module 304 then compares the new hash value with a hash value of the first data block stored in a second data block in the hash chain (e.g., "1A3F"). If the new hash value (e.g., "1A3F") and the stored hash value (e.g., "1A3F") match, then authenticity of the first data block is confirmed. Alternatively, if the new hash value and the stored hash value do not match, then authenticity of the first data block is not confirmed.

The concurrent hash verification module 306 can be configured to verify that hash values in a hash chain are being generated correctly. The concurrent hash verification module 306 can compute a hash value for a data block after a hash value for the data block has been generated and stored by a subsequent data block. The computed hash value and the generated hash value should match unless the data block was altered or the hash values were generated incorrectly. For example, a hash value can be generated based on a first data block and stored in a second data block. The concurrent hash verification module 306 can determine another hash value of the first data block and can compare the determined hash value with the hash value stored in the second data block. If the determined hash value matches the hash value stored in the second data block, then the hash value was correctly generated. If the determined hash value does not match the hash value stored in the second data block, then the concurrent hash verification module 306 can determine that an error has likely occurred. For example, the error may indicate that the hash value for the first data block that is stored in the second data block was likely not generated correctly. As a result, in some embodiments, such an error can trigger construction of a new hash chain. In some embodiments, an error log describing the error can be generated.

Figure 4A:
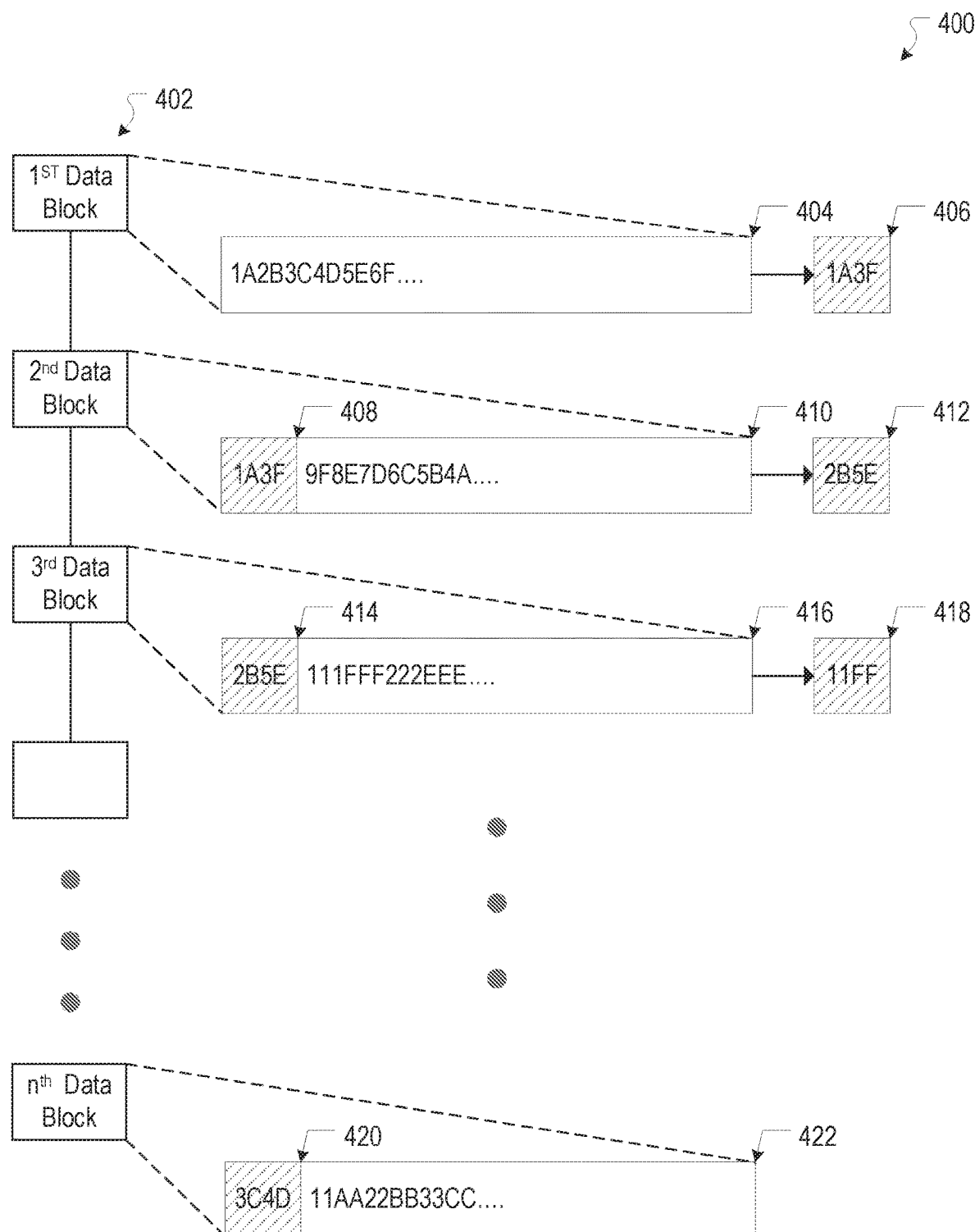
FIG. 4A illustrates an example process for constructing a hash chain, according to an embodiment of the present technology.

FIG. 4A illustrates an example hash chain construction process 400, according to an embodiment of the present technology. A hash chain 402 can comprise n data blocks. In some embodiments, the hash chain 402 comprises sensor data from a vehicle. In the example of FIG. 4A, a first hash value 406 can be determined for a first data block 404. For example, the first hash value 406 can be determined by applying a cryptographic hash function to the first data block 404. In this example, the first hash value 406 is an alphanumeric string "1A3F". The first hash value 406 is included in a header 408 of a second data block 410. A second hash value 412 can be determined for the second data block 410 by applying the cryptographic hash function. In this example, the second hash value 412 is an alphanumeric string "2B5E". Similarly, the second hash value 412 is included in a header 414 of a third data block 416. A third hash value 418 can be determined for the third data block 416 by applying the cryptographic hash function. In this example, the third hash value 418 is an alphanumeric string "11FF". The example hash chain process 400 continues until the $(n-1)^{th}$ hash value (e.g., "3C4D") is stored in a header 420 of the $n^{th}$ data block 422.

Figure 4B:
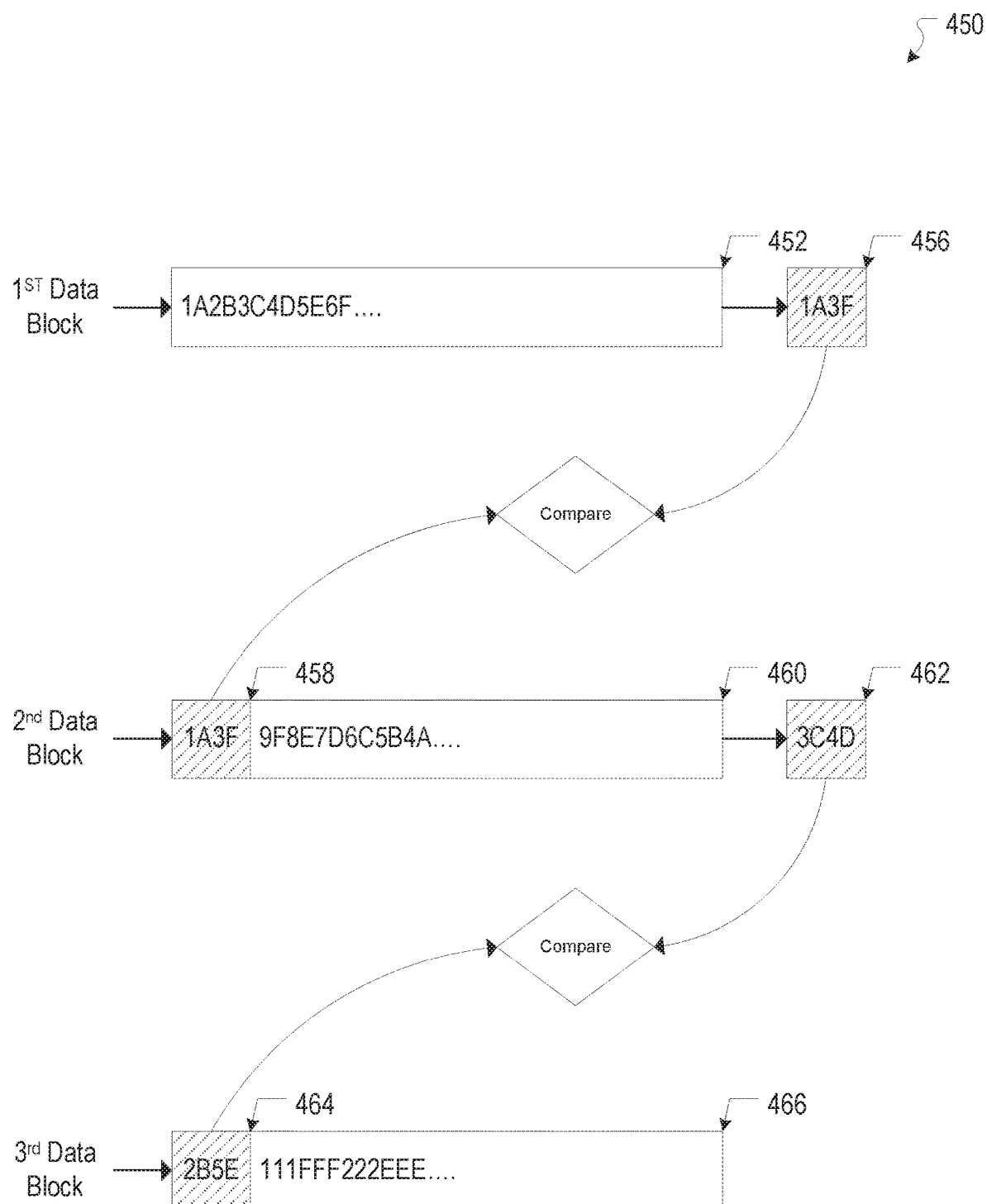
FIG. 4B illustrates an example process for verifying a hash chain, according to an embodiment of the present technology.

FIG. 4B illustrates an example hash chain verification process 450, according to an embodiment of the present technology. A hash chain can comprise multiple data blocks that include, for example, portions of sensor data collected by a vehicle. In FIG. 4B, a hash chain includes a first data block 452, a second data block 460, and a third data block 466. In this example, an authenticity of the first data block 452 can be determined by generating a hash value 456 for the first data block 452 using a cryptographic hash function. The determined hash value 456 can be compared with a hash value of the first data block 452 that is stored in a header 458 of the second data block 460. In this example, the determined hash value 456 ("1A3F") matches the hash value stored in the header 458 ("1A3F"). As a result, a determination is made that the first data block 452 has not been altered. Similarly, an authenticity of the second data block 460 can be determined by generating a hash value 462 for the second data block 460 using the cryptographic hash function. The determined hash value 462 can be compared with a hash value of the second data block 460 that is stored in a header 464 of the third data block 466. In this example, the determined hash value 462 ("3C4D") does not match the hash value stored in the header 464 ("2B5E"). As a result, a determination is made that the second data block 460 has been altered.

Figure 5A:
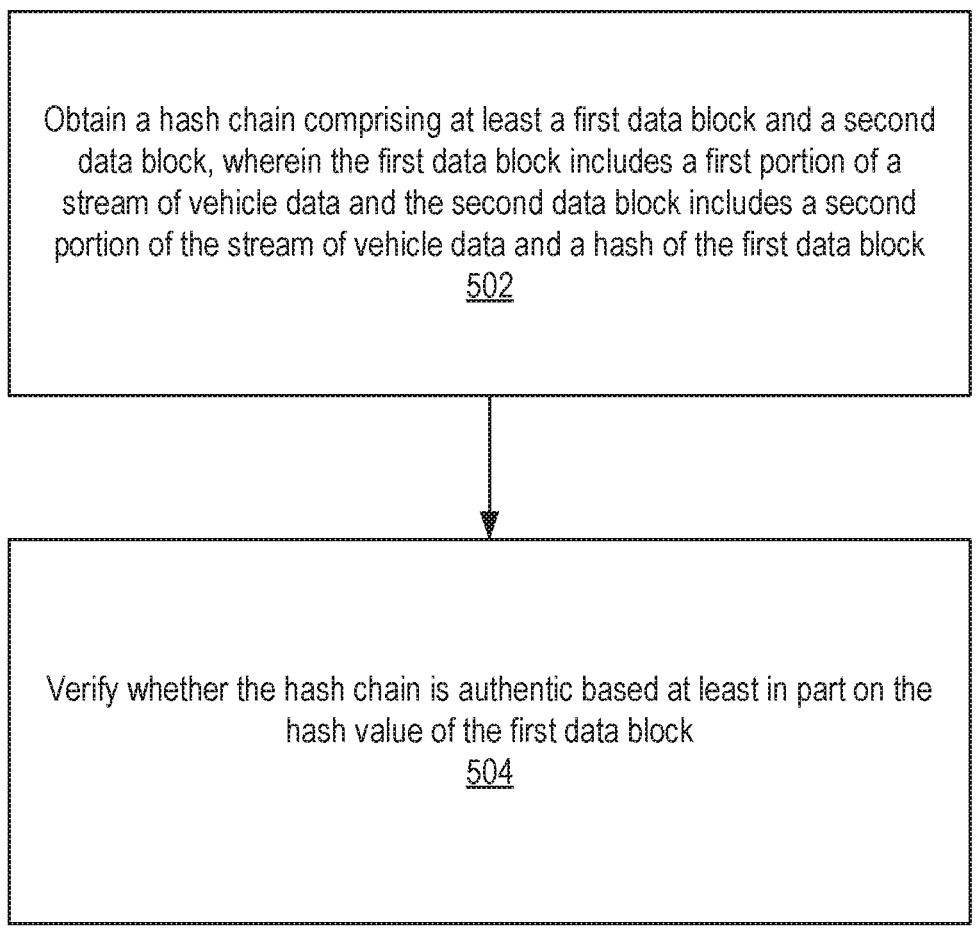
FIG. 5A-5C illustrate various example methods, according to various embodiments of the present technology.

FIG. 5A illustrates an example method 500, according to an embodiment of the present technology. At block 502, the example method 500 obtains a hash chain comprising at least a first data block and a second data block, wherein the first data block includes a first portion of a stream of vehicle data and the second data block includes a second portion of the stream of vehicle data and a hash value of the first data block. At block 504, the example method 500 verifies whether the hash chain is authentic based at least in part on the hash value of the first data block. Many variations to the example method are possible. It should be appreciated that there can be additional, fewer, or alternative steps performed in similar or alternative orders, or in parallel, within the scope of the various embodiments discussed herein unless otherwise stated.

Figure 5B:
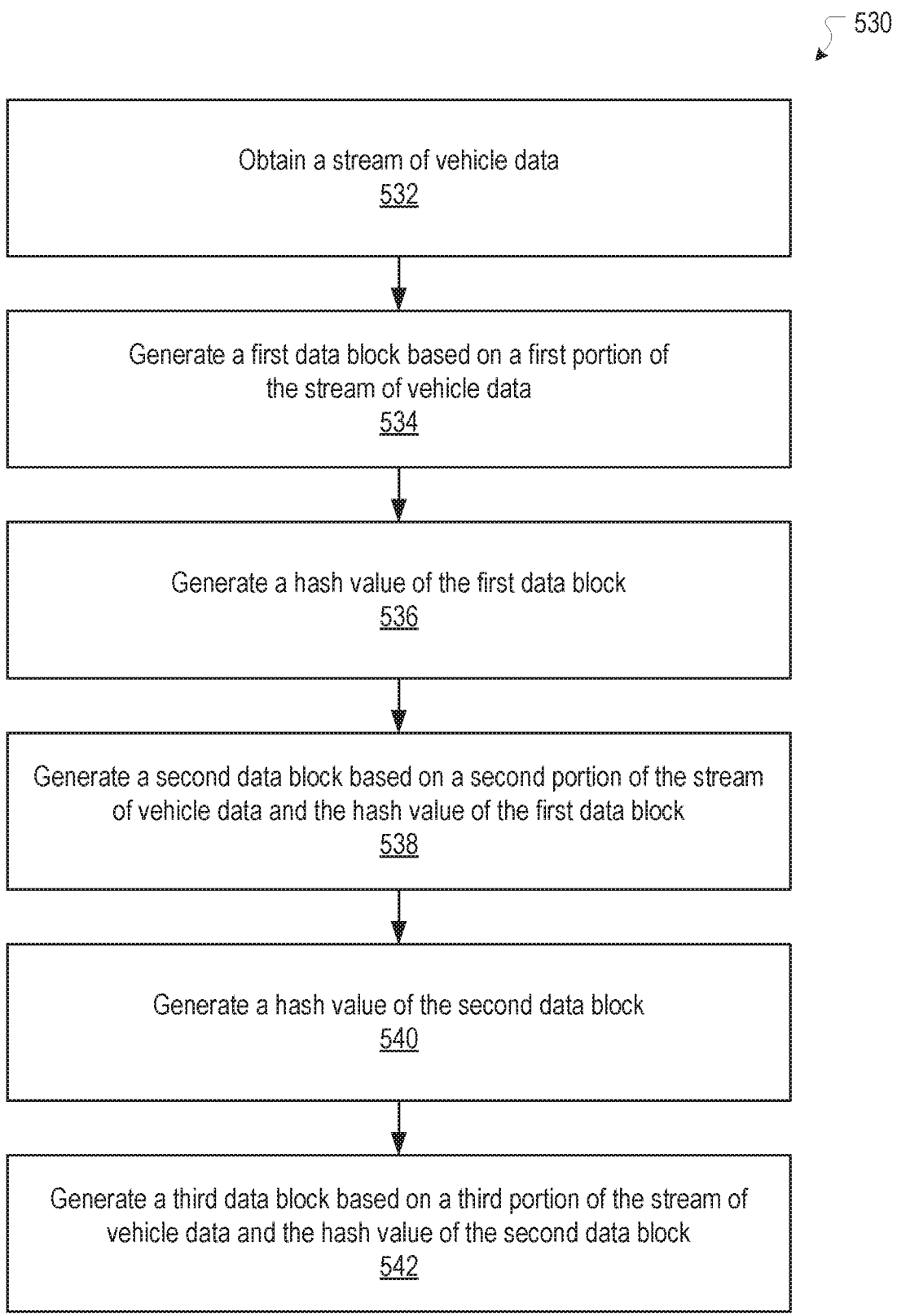

FIG. 5B illustrates an example method 530, according to an embodiment of the present technology. At block 532, the example method 530 obtains a stream of vehicle data. At block 534, the example method 530 generates a first data block based on a first portion of the stream of vehicle data. At block 536, the example method 530 generates a hash value of the first data block. At block 538, the example method 530 generates a second data block based on a second portion of the stream of vehicle data and the hash value of the first data block. At block 540, the example method 530 generates a hash value of the second data block. At block 542, the example method 530 generates a third data block based on a third portion of the stream of vehicle data and the hash value of the second data block. Many variations to the example method are possible. It should be appreciated that there can be additional, fewer, or alternative steps performed in similar or alternative orders, or in parallel, within the scope of the various embodiments discussed herein unless otherwise stated.

Figure 5C:
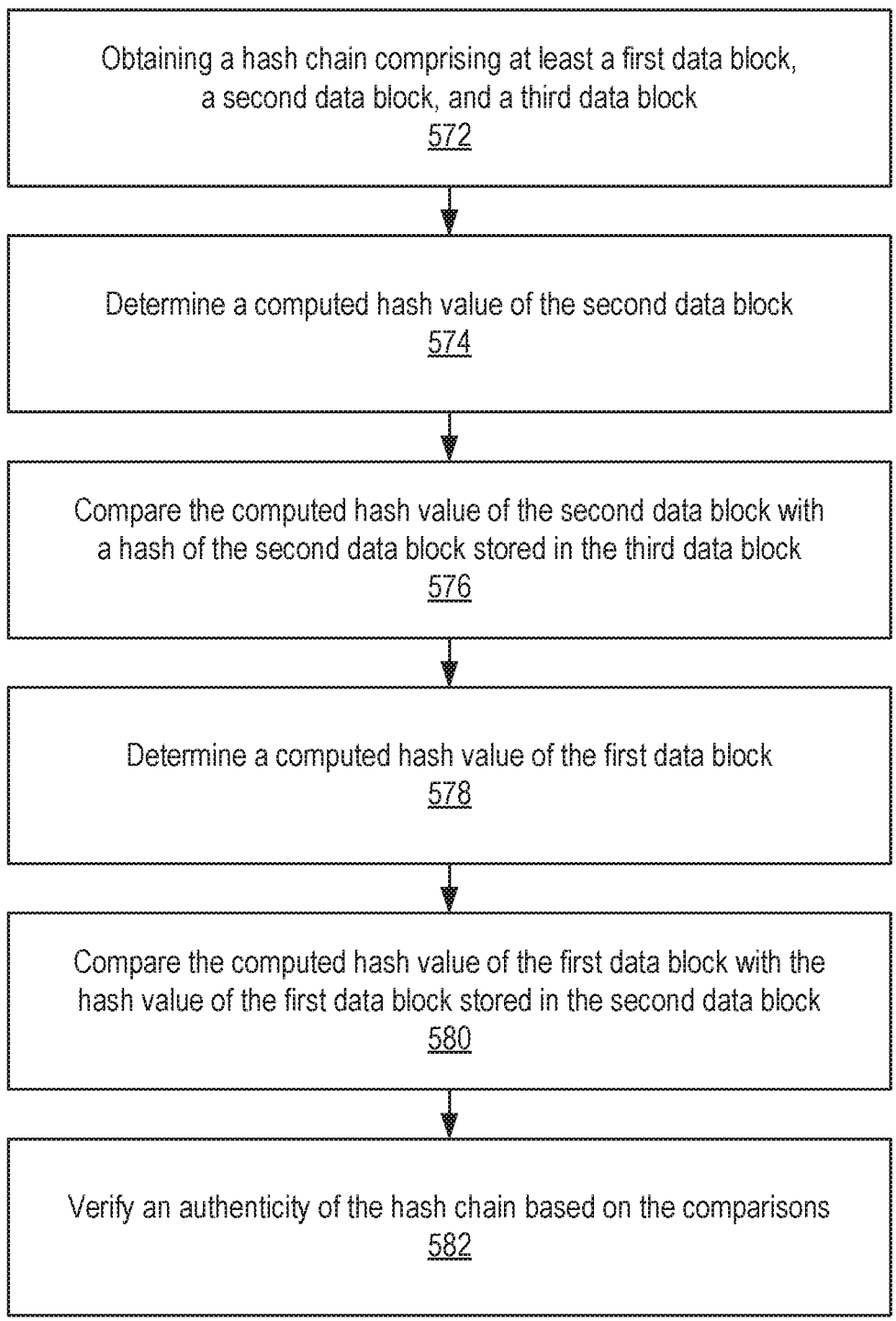

FIG. 5C illustrates an example method 570, according to an embodiment of the present technology. At block 572, the example method 570 obtains a hash chain comprising at least a first data block, a second data block, and a third data block. At block 574, the example method 570 determines a computed hash value of the second data block. At block 576, the example method 570 compares the computed hash value of the second data block with a hash value of the second data block stored in the third data block. At block 578, the example method 570 determines a computed hash value of the first data block. At block 580, the example method 570 compares the computed hash value of the first data block with the hash value of the first data block stored in the second data block. At block 582, the example method 570 verifies an authenticity of the hash chain based on the comparisons. Many variations to the example method are possible. It should be appreciated that there can be additional, fewer, or alternative steps performed in similar or alternative orders, or in parallel, within the scope of the various embodiments discussed herein unless otherwise stated.

FIG. 6 illustrates an example block diagram of a transportation management environment for matching ride requestors with vehicles. In particular embodiments, the environment may include various computing entities, such as a user computing device 630 of a user 601 (e.g., a ride provider or requestor), a transportation management system 660, a vehicle 640, and one or more third-party systems 670. The vehicle 640 can be autonomous, semi-autonomous, or manually drivable. The computing entities may be communicatively connected over any suitable network 610. As an example and not by way of limitation, one or more portions of network 610 may include an ad hoc network, an extranet, a virtual private network (VPN), a local area network (LAN), a wireless LAN (WLAN), a wide area network (WAN), a wireless WAN (WWAN), a metropolitan area network (MAN), a portion of the Internet, a portion of Public Switched Telephone Network (PSTN), a cellular network, or a combination of any of the above. In particular embodiments, any suitable network arrangement and protocol enabling the computing entities to communicate with each other may be used. Although FIG. 6 illustrates a single user device 630, a single transportation management system 660, a single vehicle 640, a plurality of third-party systems 670, and a single network 610, this disclosure contemplates any suitable number of each of these entities. As an example and not by way of limitation, the network environment may include multiple users 601, user devices 630, transportation management systems 660, vehicles 640, third-party systems 670, and networks 610. In some embodiments, some or all modules of the data recorder module 202 in FIG. 2 may be implemented by one or more computing systems of the transportation management system 660. In some embodiments, some or all modules of the data recorder module 202 in FIG. 2 may be implemented by one or more computing systems in the vehicle 640.

The user device 630, transportation management system 660, vehicle 640, and third-party system 670 may be communicatively connected or co-located with each other in whole or in part. These computing entities may communicate via different transmission technologies and network types. For example, the user device 630 and the vehicle 640 may communicate with each other via a cable or short-range wireless communication (e.g., Bluetooth, NFC, WI-FI, etc.), and together they may be connected to the Internet via a cellular network that is accessible to either one of the devices (e.g., the user device 630 may be a smartphone with LTE connection). The transportation management system 660 and third-party system 670, on the other hand, may be connected to the Internet via their respective LAN/WLAN networks and Internet Service Providers (ISP). FIG. 6 illustrates transmission links 650 that connect user device 630, vehicle 640, transportation management system 660, and third-party system 670 to communication network 610. This disclosure contemplates any suitable transmission links 650, including, e.g., wire connections (e.g., USB, Lightning, Digital Subscriber Line (DSL) or Data Over Cable Service Interface Specification (DOCSIS)), wireless connections (e.g., WI-FI, WiMAX, cellular, satellite, NFC, Bluetooth), optical connections (e.g., Synchronous Optical Networking (SONET), Synchronous Digital Hierarchy (SDH)), any other wireless communication technologies, and any combination thereof. In particular embodiments, one or more links 650 may connect to one or more networks 610, which may include in part, e.g., ad-hoc network, the Intranet, extranet, VPN, LAN, WLAN, WAN, WWAN, MAN, PSTN, a cellular network, a satellite network, or any combination thereof. The computing entities need not necessarily use the same type of transmission link 650. For example, the user device 630 may communicate with the transportation management system via a cellular network and the Internet, but communicate with the vehicle 640 via Bluetooth or a physical wire connection.

In particular embodiments, the transportation management system 660 may fulfill ride requests for one or more users 601 by dispatching suitable vehicles. The transportation management system 660 may receive any number of ride requests from any number of ride requestors 601. In particular embodiments, a ride request from a ride requestor 601 may include an identifier that identifies the ride requestor in the system 660. The transportation management system 660 may use the identifier to access and store the ride requestor's 601 information, in accordance with the requestor's 601 privacy settings. The ride requestor's 601 information may be stored in one or more data stores (e.g., a relational database system) associated with and accessible to the transportation management system 660. In particular embodiments, ride requestor information may include profile information about a particular ride requestor 601. In particular embodiments, the ride requestor 601 may be associated with one or more categories or types, through which the ride requestor 601 may be associated with aggregate information about certain ride requestors of those categories or types. Ride information may include, for example, preferred pick-up and drop-off locations, driving preferences (e.g., safety comfort level, preferred speed, rates of acceleration/deceleration, safety distance from other vehicles when travelling at various speeds, route, etc.), entertainment preferences and settings (e.g., preferred music genre or playlist, audio volume, display brightness, etc.), temperature settings, whether conversation with the driver is welcomed, frequent destinations, historical riding patterns (e.g., time of day of travel, starting and ending locations, etc.), preferred language, age, gender, or any other suitable information. In particular embodiments, the transportation management system 660 may classify a user 601 based on known information about the user 601 (e.g., using machine-learning classifiers), and use the classification to retrieve relevant aggregate information associated with that class. For example, the system 660 may classify a user 601 as a young adult and retrieve relevant aggregate information associated with young adults, such as the type of music generally preferred by young adults.

Transportation management system 660 may also store and access ride information. Ride information may include locations related to the ride, traffic data, route options, optimal pick-up or drop-off locations for the ride, or any other suitable information associated with a ride. As an example and not by way of limitation, when the transportation management system 660 receives a request to travel from San Francisco International Airport (SFO) to Palo Alto, Calif., the system 660 may access or generate any relevant ride information for this particular ride request. The ride information may include, for example, preferred pick-up locations at SFO; alternate pick-up locations in the event that a pick-up location is incompatible with the ride requestor (e.g., the ride requestor may be disabled and cannot access the pick-up location) or the pick-up location is otherwise unavailable due to construction, traffic congestion, changes in pick-up/drop-off rules, or any other reason; one or more routes to navigate from SFO to Palo Alto; preferred off-ramps for a type of user; or any other suitable information associated with the ride. In particular embodiments, portions of the ride information may be based on historical data associated with historical rides facilitated by the system 660. For example, historical data may include aggregate information generated based on past ride information, which may include any ride information described herein and telemetry data collected by sensors in vehicles and user devices. Historical data may be associated with a particular user (e.g., that particular user's preferences, common routes, etc.), a category/class of users (e.g., based on demographics), and all users of the system 660. For example, historical data specific to a single user may include information about past rides that particular user has taken, including the locations at which the user is picked up and dropped off, music the user likes to listen to, traffic information associated with the rides, time of the day the user most often rides, and any other suitable information specific to the user. As another example, historical data associated with a category/class of users may include, e.g., common or popular ride preferences of users in that category/class, such as teenagers preferring pop music, ride requestors who frequently commute to the financial district may prefer to listen to the news, etc. As yet another example, historical data associated with all users may include general usage trends, such as traffic and ride patterns. Using historical data, the system 660 in particular embodiments may predict and provide ride suggestions in response to a ride request. In particular embodiments, the system 660 may use machine-learning, such as neural networks, regression algorithms, instance-based algorithms (e.g., k-Nearest Neighbor), decision-tree algorithms, Bayesian algorithms, clustering algorithms, association-rule-learning algorithms, deep-learning algorithms, dimensionality-reduction algorithms, ensemble algorithms, and any other suitable machine-learning algorithms known to persons of ordinary skill in the art. The machine-learning models may be trained using any suitable training algorithm, including supervised learning based on labeled training data, unsupervised learning based on unlabeled training data, and semi-supervised learning based on a mixture of labeled and unlabeled training data.

In particular embodiments, transportation management system 660 may include one or more server computers. Each server may be a unitary server or a distributed server spanning multiple computers or multiple datacenters. The servers may be of various types, such as, for example and without limitation, web server, news server, mail server, message server, advertising server, file server, application server, exchange server, database server, proxy server, another server suitable for performing functions or processes described herein, or any combination thereof. In particular embodiments, each server may include hardware, software, or embedded logic components or a combination of two or more such components for carrying out the appropriate functionalities implemented or supported by the server. In particular embodiments, transportation management system 660 may include one or more data stores. The data stores may be used to store various types of information, such as ride information, ride requestor information, ride provider information, historical information, third-party information, or any other suitable type of information. In particular embodiments, the information stored in the data stores may be organized according to specific data structures. In particular embodiments, each data store may be a relational, columnar, correlation, or any other suitable type of database system. Although this disclosure describes or illustrates particular types of databases, this disclosure contemplates any suitable types of databases. Particular embodiments may provide interfaces that enable a user device 630 (which may belong to a ride requestor or provider), a transportation management system 660, vehicle system 640, or a third-party system 670 to process, transform, manage, retrieve, modify, add, or delete the information stored in the data store.

In particular embodiments, transportation management system 660 may include an authorization server (or any other suitable component(s)) that allows users 601 to opt-in to or opt-out of having their information and actions logged, recorded, or sensed by transportation management system 660 or shared with other systems (e.g., third-party systems 670). In particular embodiments, a user 601 may opt-in or opt-out by setting appropriate privacy settings. A privacy setting of a user may determine what information associated with the user may be logged, how information associated with the user may be logged, when information associated with the user may be logged, who may log information associated with the user, whom information associated with the user may be shared with, and for what purposes information associated with the user may be logged or shared. Authorization servers may be used to enforce one or more privacy settings of the users 601 of transportation management system 660 through blocking, data hashing, anonymization, or other suitable techniques as appropriate.

In particular embodiments, third-party system 670 may be a network-addressable computing system that may provide HD maps or host GPS maps, customer reviews, music or content, weather information, or any other suitable type of information. Third-party system 670 may generate, store, receive, and send relevant data, such as, for example, map data, customer review data from a customer review website, weather data, or any other suitable type of data. Third-party system 670 may be accessed by the other computing entities of the network environment either directly or via network 610. For example, user device 630 may access the third-party system 670 via network 610, or via transportation management system 660. In the latter case, if credentials are required to access the third-party system 670, the user 601 may provide such information to the transportation management system 660, which may serve as a proxy for accessing content from the third-party system 670.

In particular embodiments, user device 630 may be a mobile computing device such as a smartphone, tablet computer, or laptop computer. User device 630 may include one or more processors (e.g., CPU, GPU), memory, and storage. An operating system and applications may be installed on the user device 630, such as, e.g., a transportation application associated with the transportation management system 660, applications associated with third-party systems 670, and applications associated with the operating system. User device 630 may include functionality for determining its location, direction, or orientation, based on integrated sensors such as GPS, compass, gyroscope, or accelerometer. User device 630 may also include wireless transceivers for wireless communication and may support wireless communication protocols such as Bluetooth, near-field communication (NFC), infrared (IR) communication, WI-FI, and 2G/3G/4G/LTE mobile communication standard. User device 630 may also include one or more cameras, scanners, touchscreens, microphones, speakers, and any other suitable input-output devices.

In particular embodiments, the vehicle 640 may be equipped with an array of sensors 644, a navigation system 646, and a ride-service computing device 648. In particular embodiments, a fleet of vehicles 640 may be managed by the transportation management system 660. The fleet of vehicles 640, in whole or in part, may be owned by the entity associated with the transportation management system 660, or they may be owned by a third-party entity relative to the transportation management system 660. In either case, the transportation management system 660 may control the operations of the vehicles 640, including, e.g., dispatching select vehicles 640 to fulfill ride requests, instructing the vehicles 640 to perform select operations (e.g., head to a service center or charging/fueling station, pull over, stop immediately, self-diagnose, lock/unlock compartments, change music station, change temperature, and any other suitable operations), and instructing the vehicles 640 to enter select operation modes (e.g., operate normally, drive at a reduced speed, drive under the command of human operators, and any other suitable operational modes).

In particular embodiments, the vehicles 640 may receive data from and transmit data to the transportation management system 660 and the third-party system 670. Examples of received data may include, e.g., instructions, new software or software updates, maps, 3D models, trained or untrained machine-learning models, location information (e.g., location of the ride requestor, the vehicle 640 itself, other vehicles 640, and target destinations such as service centers), navigation information, traffic information, weather information, entertainment content (e.g., music, video, and news) ride requestor information, ride information, and any other suitable information. Examples of data transmitted from the vehicle 640 may include, e.g., telemetry and sensor data, determinations/decisions based on such data, vehicle condition or state (e.g., battery/fuel level, tire and brake conditions, sensor condition, speed, odometer, etc.), location, navigation data, passenger inputs (e.g., through a user interface in the vehicle 640, passengers may send/receive data to the transportation management system 660 and third-party system 670), and any other suitable data.

In particular embodiments, vehicles 640 may also communicate with each other, including those managed and not managed by the transportation management system 660. For example, one vehicle 640 may communicate with another vehicle data regarding their respective location, condition, status, sensor reading, and any other suitable information. In particular embodiments, vehicle-to-vehicle communication may take place over direct short-range wireless connection (e.g., WI-FI, Bluetooth, NFC) or over a network (e.g., the Internet or via the transportation management system 660 or third-party system 670), or both.

In particular embodiments, a vehicle 640 may obtain and process sensor/telemetry data. Such data may be captured by any suitable sensors. For example, the vehicle 640 may have a Light Detection and Ranging (LiDAR) sensor array of multiple LiDAR transceivers that are configured to rotate 360°, emitting pulsed laser light and measuring the reflected light from objects surrounding vehicle 640. In particular embodiments, LiDAR transmitting signals may be steered by use of a gated light valve, which may be a MEMs device that directs a light beam using the principle of light diffraction. Such a device may not use a gimbaled mirror to steer light beams in 360° around the vehicle. Rather, the gated light valve may direct the light beam into one of several optical fibers, which may be arranged such that the light beam may be directed to many discrete positions around the vehicle. Thus, data may be captured in 360° around the vehicle, but no rotating parts may be necessary. A LiDAR is an effective sensor for measuring distances to targets, and as such may be used to generate a three-dimensional (3D) model of the external environment of the vehicle 640. As an example and not by way of limitation, the 3D model may represent the external environment including objects such as other cars, curbs, debris, objects, and pedestrians up to a maximum range of the sensor arrangement (e.g., 50, 100, or 200 meters). As another example, the vehicle 640 may have optical cameras pointing in different directions. The cameras may be used for, e.g., recognizing roads, lane markings, street signs, traffic lights, police, other vehicles, and any other visible objects of interest. To enable the vehicle 640 to "see" at night, infrared cameras may be installed. In particular embodiments, the vehicle may be equipped with stereo vision for, e.g., spotting hazards such as pedestrians or tree branches on the road. As another example, the vehicle 640 may have radars for, e.g., detecting other vehicles and hazards afar. Furthermore, the vehicle 640 may have ultrasound equipment for, e.g., parking and obstacle detection. In addition to sensors enabling the vehicle 640 to detect, measure, and understand the external world around it, the vehicle 640 may further be equipped with sensors for detecting and self-diagnosing the vehicle's own state and condition. For example, the vehicle 640 may have wheel sensors for, e.g., measuring velocity; global positioning system (GPS) for, e.g., determining the vehicle's current geolocation; and inertial measurement units, accelerometers, gyroscopes, and odometer systems for movement or motion detection. While the description of these sensors provides particular examples of utility, one of ordinary skill in the art would appreciate that the utilities of the sensors are not limited to those examples. Further, while an example of a utility may be described with respect to a particular type of sensor, it should be appreciated that the utility may be achieved using any combination of sensors. For example, the vehicle 640 may build a 3D model of its surrounding based on data from its LiDAR, radar, sonar, and cameras, along with a pre-generated map obtained from the transportation management system 660 or the third-party system 670. Although sensors 644 appear in a particular location on the vehicle 640 in FIG. 6 sensors 644 may be located in any suitable location in or on the vehicle 640. Example locations for sensors include the front and rear bumpers, the doors, the front windshield, on the side panel, or any other suitable location.

In particular embodiments, the vehicle 640 may be equipped with a processing unit (e.g., one or more CPUs and GPUs), memory, and storage. The vehicle 640 may thus be equipped to perform a variety of computational and processing tasks, including processing the sensor data, extracting useful information, and operating accordingly. For example, based on images captured by its cameras and a machine-vision model, the vehicle 640 may identify particular types of objects captured by the images, such as pedestrians, other vehicles, lanes, curbs, and any other objects of interest.

In particular embodiments, the vehicle 640 may have a navigation system 646 responsible for safely navigating the vehicle 640. In particular embodiments, the navigation system 646 may take as input any type of sensor data from, e.g., a Global Positioning System (GPS) module, inertial measurement unit (IMU), LiDAR sensors, optical cameras, radio frequency (RF) transceivers, or any other suitable telemetry or sensory mechanisms. The navigation system 646 may also utilize, e.g., map data, traffic data, accident reports, weather reports, instructions, target destinations, and any other suitable information to determine navigation routes and particular driving operations (e.g., slowing down, speeding up, stopping, swerving, etc.). In particular embodiments, the navigation system 646 may use its determinations to control the vehicle 640 to operate in prescribed manners and to guide the vehicle 640 to its destinations without colliding into other objects. Although the physical embodiment of the navigation system 646 (e.g., the processing unit) appears in a particular location on the vehicle 640 in FIG. 6 navigation system 646 may be located in any suitable location in or on the vehicle 640. Example locations for navigation system 646 include inside the cabin or passenger compartment of the vehicle 640, near the engine/battery, near the front seats, rear seats, or in any other suitable location.

In particular embodiments, the vehicle 640 may be equipped with a ride-service computing device 648, which may be a tablet or any other suitable device installed by transportation management system 660 to allow the user to interact with the vehicle 640, transportation management system 660, other users 601, or third-party systems 670. In particular embodiments, installation of ride-service computing device 648 may be accomplished by placing the ride-service computing device 648 inside the vehicle 640, and configuring it to communicate with the vehicle 640 via a wired or wireless connection (e.g., via Bluetooth). Although FIG. 6 illustrates a single ride-service computing device 648 at a particular location in the vehicle 640, the vehicle 640 may include several ride-service computing devices 648 in several different locations within the vehicle. As an example and not by way of limitation, the vehicle 640 may include four ride-service computing devices 648 located in the following places: one in front of the front-left passenger seat (e.g., driver's seat in traditional U.S. automobiles), one in front of the front-right passenger seat, one in front of each of the rear-left and rear-right passenger seats. In particular embodiments, ride-service computing device 648 may be detachable from any component of the vehicle 640. This may allow users to handle ride-service computing device 648 in a manner consistent with other tablet computing devices. As an example and not by way of limitation, a user may move ride-service computing device 648 to any location in the cabin or passenger compartment of the vehicle 640, may hold ride-service computing device 648, or handle ride-service computing device 648 in any other suitable manner. Although this disclosure describes providing a particular computing device in a particular manner, this disclosure contemplates providing any suitable computing device in any suitable manner.

Figure 7:
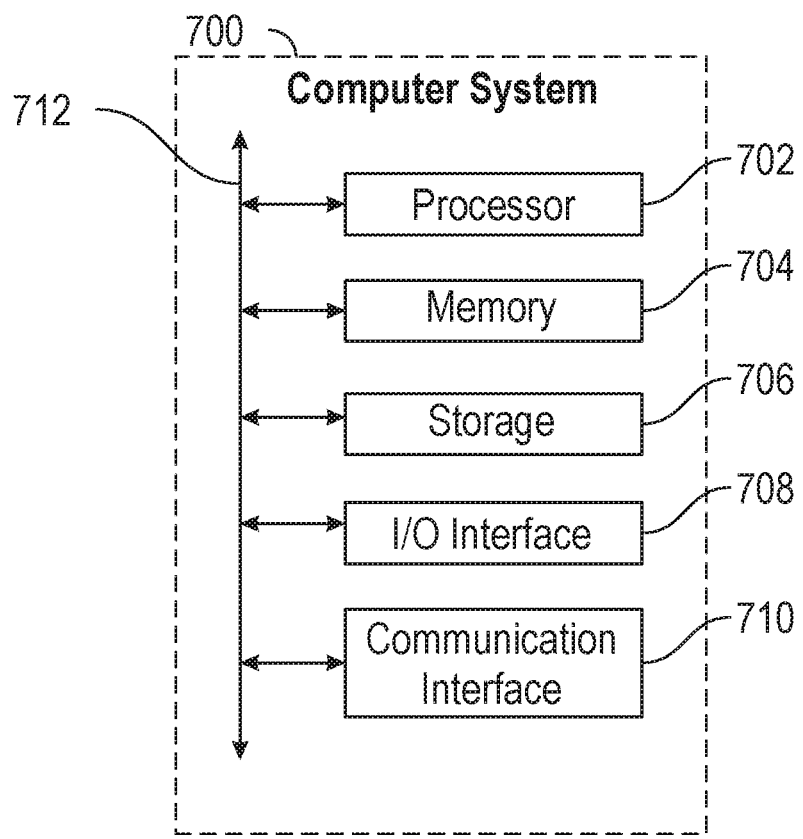
FIG. 7 illustrates an example of a computer system or computing device that can be utilized in various scenarios, according to an embodiment of the present technology.

FIG. 7 illustrates an example computer system 700. In particular embodiments, one or more computer systems 700 perform one or more steps of one or more methods described or illustrated herein. In particular embodiments, one or more computer systems 700 provide the functionalities described or illustrated herein. In particular embodiments, software running on one or more computer systems 700 performs one or more steps of one or more methods described or illustrated herein or provides the functionalities described or illustrated herein. Particular embodiments include one or more portions of one or more computer systems 700. Herein, a reference to a computer system may encompass a computing device, and vice versa, where appropriate. Moreover, a reference to a computer system may encompass one or more computer systems, where appropriate.

This disclosure contemplates any suitable number of computer systems 700. This disclosure contemplates computer system 700 taking any suitable physical form. As example and not by way of limitation, computer system 700 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 700 may include one or more computer systems 700; be unitary or distributed; span multiple locations; span multiple machines; span multiple data centers; or reside in a cloud, which may include one or more cloud components in one or more networks. Where appropriate, one or more computer systems 700 may perform without substantial spatial or temporal limitation one or more steps of one or more methods described or illustrated herein. As an example and not by way of limitation, one or more computer systems 700 may perform in real time or in batch mode one or more steps of one or more methods described or illustrated herein. One or more computer systems 700 may perform at different times or at different locations one or more steps of one or more methods described or illustrated herein, where appropriate.

In particular embodiments, computer system 700 includes a processor 702, memory 704, storage 706, an input/output (I/O) interface 708, a communication interface 710, and a bus 712. Although this disclosure describes and illustrates a particular computer system having a particular number of particular components in a particular arrangement, this disclosure contemplates any suitable computer system having any suitable number of any suitable components in any suitable arrangement.

In particular embodiments, processor 702 includes hardware for executing instructions, such as those making up a computer program. As an example and not by way of limitation, to execute instructions, processor 702 may retrieve (or fetch) the instructions from an internal register, an internal cache, memory 704, or storage 706; decode and execute them; and then write one or more results to an internal register, an internal cache, memory 704, or storage 706. In particular embodiments, processor 702 may include one or more internal caches for data, instructions, or addresses. This disclosure contemplates processor 702 including any suitable number of any suitable internal caches, where appropriate. As an example and not by way of limitation, processor 702 may include one or more instruction caches, one or more data caches, and one or more translation lookaside buffers (TLBs). Instructions in the instruction caches may be copies of instructions in memory 704 or storage 706, and the instruction caches may speed up retrieval of those instructions by processor 702. Data in the data caches may be copies of data in memory 704 or storage 706 that are to be operated on by computer instructions; the results of previous instructions executed by processor 702 that are accessible to subsequent instructions or for writing to memory 704 or storage 706; or any other suitable data. The data caches may speed up read or write operations by processor 702. The TLBs may speed up virtual-address translation for processor 702. In particular embodiments, processor 702 may include one or more internal registers for data, instructions, or addresses. This disclosure contemplates processor 702 including any suitable number of any suitable internal registers, where appropriate. Where appropriate, processor 702 may include one or more arithmetic logic units (ALUs), be a multi-core processor, or include one or more processors 702. Although this disclosure describes and illustrates a particular processor, this disclosure contemplates any suitable processor.

In particular embodiments, memory 704 includes main memory for storing instructions for processor 702 to execute or data for processor 702 to operate on. As an example and not by way of limitation, computer system 700 may load instructions from storage 706 or another source (such as another computer system 700) to memory 704. Processor 702 may then load the instructions from memory 704 to an internal register or internal cache. To execute the instructions, processor 702 may retrieve the instructions from the internal register or internal cache and decode them. During or after execution of the instructions, processor 702 may write one or more results (which may be intermediate or final results) to the internal register or internal cache. Processor 702 may then write one or more of those results to memory 704. In particular embodiments, processor 702 executes only instructions in one or more internal registers or internal caches or in memory 704 (as opposed to storage 706 or elsewhere) and operates only on data in one or more internal registers or internal caches or in memory 704 (as opposed to storage 706 or elsewhere). One or more memory buses (which may each include an address bus and a data bus) may couple processor 702 to memory 704. Bus 712 may include one or more memory buses, as described in further detail below. In particular embodiments, one or more memory management units (MMUs) reside between processor 702 and memory 704 and facilitate accesses to memory 704 requested by processor 702. In particular embodiments, memory 704 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 704 may include one or more memories 704, where appropriate. Although this disclosure describes and illustrates particular memory, this disclosure contemplates any suitable memory.

In particular embodiments, storage 706 includes mass storage for data or instructions. As an example and not by way of limitation, storage 706 may include a hard disk drive (HDD), a floppy disk drive, flash memory, an optical disc, a magneto-optical disc, magnetic tape, or a Universal Serial Bus (USB) drive or a combination of two or more of these. Storage 706 may include removable or non-removable (or fixed) media, where appropriate. Storage 706 may be internal or external to computer system 700, where appropriate. In particular embodiments, storage 706 is non-volatile, solid-state memory. In particular embodiments, storage 706 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 706 taking any suitable physical form. Storage 706 may include one or more storage control units facilitating communication between processor 702 and storage 706, where appropriate. Where appropriate, storage 706 may include one or more storages 706. Although this disclosure describes and illustrates particular storage, this disclosure contemplates any suitable storage.

In particular embodiments, I/O interface 708 includes hardware or software, or both, providing one or more interfaces for communication between computer system 700 and one or more I/O devices. Computer system 700 may include one or more of these I/O devices, where appropriate. One or more of these I/O devices may enable communication between a person and computer system 700. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 708 for them. Where appropriate, I/O interface 708 may include one or more device or software drivers enabling processor 702 to drive one or more of these I/O devices. I/O interface 708 may include one or more I/O interfaces 708, where appropriate. Although this disclosure describes and illustrates a particular I/O interface, this disclosure contemplates any suitable I/O interface.

In particular embodiments, communication interface 710 includes hardware or software, or both providing one or more interfaces for communication (such as, for example, packet-based communication) between computer system 700 and one or more other computer systems 700 or one or more networks. As an example and not by way of limitation, communication interface 710 may include a network interface controller (NIC) or network adapter for communicating with an Ethernet or any other wire-based network or a wireless NIC (WNIC) or wireless adapter for communicating with a wireless network, such as a WI-FI network. This disclosure contemplates any suitable network and any suitable communication interface 710 for it. As an example and not by way of limitation, computer system 700 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 700 may communicate with a wireless PAN (WPAN) (such as, for example, a Bluetooth WPAN), a WI-FI network, a WI-MAX network, a cellular telephone network (such as, for example, a Global System for Mobile Communications (GSM) network), or any other suitable wireless network or a combination of two or more of these. Computer system 700 may include any suitable communication interface 710 for any of these networks, where appropriate. Communication interface 710 may include one or more communication interfaces 710, where appropriate. Although this disclosure describes and illustrates a particular communication interface, this disclosure contemplates any suitable communication interface.

In particular embodiments, bus 712 includes hardware or software, or both coupling components of computer system 700 to each other. As an example and not by way of limitation, bus 712 may include an Accelerated Graphics Port (AGP) or any other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 712 may include one or more buses 712, where appropriate. Although this disclosure describes and illustrates a particular bus, this disclosure contemplates any suitable bus or interconnect.

Herein, a computer-readable non-transitory storage medium or media may include one or more semiconductor-based or other types of integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A or B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

Methods described herein may vary in accordance with the present disclosure. Various embodiments of this disclosure may repeat one or more steps of the methods described herein, where appropriate. Although this disclosure describes and illustrates particular steps of certain methods as occurring in a particular order, this disclosure contemplates any suitable steps of the methods occurring in any suitable order or in any combination which may include all, some, or none of the steps of the methods. Furthermore, although this disclosure may describe and illustrate particular components, devices, or systems carrying out particular steps of a method, this disclosure contemplates any suitable combination of any suitable components, devices, or systems carrying out any suitable steps of the method.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, modules, elements, feature, functions, operations, or steps, any of these embodiments may include any combination or permutation of any of the components, modules, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A computer-implemented method comprising:
obtaining, by a computing system, a hash chain generated based on a stream of vehicle data that comprises sensor data representing environmental information external to a vehicle captured by one or more sensors of the vehicle, wherein the obtaining the hash chain comprises:
generating, by the computing system, a first data block of the hash chain based on first sensor data associated with the stream of vehicle data,
generating, by the computing system, a hash value of the first data block, and
generating, by the computing system, a second data block of the hash chain based on second sensor data associated with the stream of vehicle data and the hash value of the first data block; and
subsequent to a determination that the vehicle encountered a driving incident:
verifying, by the computing system, whether the hash chain is authentic based at least in part on comparing the hash value of the first data block to a hash value of the first data block, and
in response to a determination that a computed hash value of the first data block does not match the hash value of the first data block, generating, by the computing system, an additional hash chain based on the stream of vehicle data.

2. The computer-implemented method of claim 1, wherein the obtaining the hash chain further comprises:
generating a hash value of the second data block;
generating a third data block based on third sensor data associated with the stream of vehicle data and the hash value of the second data block; and
generating an error upon determining a computed hash value of the second data block and the hash value of the second data block stored in the third data block do not match.

3. The computer-implemented method of claim 2, further comprising:
in response to a determination that the computed hash value of the second data block and the hash value of the second data block stored in the third data block do not match, generating another new hash chain based on the stream of vehicle data.

4. The computer-implemented method of claim 1, wherein the first data block stores the first sensor data and information describing a timestamp indicating when the first sensor data was captured or a geographic location from where the first sensor data was captured.

5. The computer-implemented method of claim 1, wherein generating the additional hash chain further comprises:
generating an error log indicating that the computed hash value of the first data block does not match the generated hash value of the first data block.

6. The computer-implemented method of claim 1, wherein the hash value of the first data block is stored in a header of the second data block.

7. The computer-implemented method of claim 1, wherein the hash value of the first data block is associated with a digital signature based on application of a cryptographic key to the hash value of the first data block.

8. The computer-implemented method of claim 7, wherein an authenticity of the hash value of the first data block is confirmed by verifying the digital signature.

9. The computer-implemented method of claim 8, wherein the digital signature is generated by applying a private key, and wherein the authenticity of the digital signature is confirmed by applying a public key associated with the private key.

10. The computer-implemented method of claim 1, wherein the stream of vehicle data comprises data generated from at least one of: one or more computing systems associated with a vehicle, an optical camera, a Light Detection And Ranging (LiDAR) sensor, an inertial measurement unit (IMU), a radar sensor, an infrared camera, and an ultrasonic sensor.

11. A system comprising:
at least one processor; and
a memory storing instructions that, when executed by the at least one processor, cause the system to perform:
obtaining a hash chain generated based on a stream of vehicle data that comprises sensor data representing environmental information external to a vehicle captured by one or more sensors of the vehicle, wherein the obtaining the hash chain comprises:
generating a first data block of the hash chain based on first sensor data associated with the stream of vehicle data,
generating a hash value of the first data block, and
generating a second data block of the hash chain based on second sensor data associated with the stream of vehicle data and the hash value of the first data block; and
subsequent to a determination that the vehicle encountered a driving incident:
verifying whether the hash chain is authentic based at least in part on comparing the hash value of the first data block to a computed hash value of the first data block, and in response to a determination that the computed hash value of the first data block does not match the hash value of the first data block, generating an additional hash chain based on the stream of vehicle data.

12. The system of claim 11, wherein the obtaining the hash chain further comprises:
generating a hash value of the second data block;
generating a third data block based on third sensor data associated with the stream of vehicle data and the hash value of the second data block; and
generating an error upon determining a computed hash value of the second data block and the hash value of the second data block stored in the third data block do not match.

13. The system of claim 12, further comprising:
in response to a determination that the computed hash value of the second data block and the hash value of the second data block stored in the third data block do not match, generating another new hash chain based on the stream of vehicle data.

14. The system of claim 11, wherein the first data block stores the first sensor data and information describing a timestamp indicating when the first sensor data was captured or a geographic location from where the first sensor data was captured.

15. The system of claim 11, wherein generating the additional hash chain further comprises:
generating an error log indicating that the computed hash value of the first data block does not match the generated hash value of the first data block.

16. A non-transitory computer-readable storage medium including instructions that, when executed by at least one processor of a computing system, cause the computing system to perform:
obtaining a hash chain generated based on a stream of vehicle data that comprises sensor data representing environmental information external to a vehicle captured by one or more sensors of the vehicle, wherein the obtaining the hash chain comprises:
generating a first data block of the hash chain based on first sensor data associated with the stream of vehicle data,
generating a hash value of the first data block, and
generating a second data block of the hash chain based on second sensor data associated with the stream of vehicle data and the hash value of the first data block; and subsequent to a determination that the vehicle encountered a driving incident:
verifying whether the hash chain is authentic based at least in part on comparing the hash value of the first data block to a computed hash value of the first data block, and
in response to a determination that the computed hash value of the first data block does not match the hash value of the first data block, generating an additional hash chain based on the stream of vehicle data.

17. The non-transitory computer-readable storage medium of claim 16, wherein the obtaining the hash chain further comprises:
generating a hash value of the second data block;
generating a third data block based on third sensor data associated with the stream of vehicle data and the hash value of the second data block; and
generating an error upon determining a computed hash value of the second data block and the hash value of the second data block stored in the third data block do not match.

18. The non-transitory computer-readable medium of claim 17, wherein the non-transitory computer-readable storage medium further includes instructions that when executed by the at least one processor further cause the computing system to perform:
in response to a determination that the computed hash value of the second data block and the hash value of the second data block stored in the third data block do not match, generating another new hash chain based on the stream of vehicle data.

19. The non-transitory computer-readable medium of claim 16, wherein the first data block stores the first sensor data and information describing a timestamp indicating when the first sensor data was captured or a geographic location from where the first sensor data was captured.

20. The non-transitory computer-readable medium of claim 16, wherein generating the additional hash chain further comprises:
generating an error log indicating that the computed hash value of the first data block does not match the generated hash value of the first data block.

* * * * *

UNITED STATES PATENT AND TRADEMARK OFFICE
CERTIFICATE OF CORRECTION

PATENT NO. : 11,157,655 B2
APPLICATION NO. : 16/236865
DATED : October 26, 2021
INVENTOR(S) : Carlos Manuel Bueno It is certified that error appears in the above-identified patent and that said Letters Patent is hereby corrected as shown below:

In the Claims

In Column 21, Lines 54-56, replace "comparing the hash value of the first data block to a hash value of the first data block" with -- comparing the hash value of the first data block to a computed hash value of the first data block --.

In Column 21, Lines 57-58, replace "a determination that a computed hash value" with -- a determination that the computed hash value --.

In Column 23, Lines 28-29, replace "the generated hash value" with -- the hash value --.

In Column 24, Lines 43-44, replace "the generated hash value" with -- the hash value --.

Signed and Sealed this
Seventeenth Day of May, 2022

Katherine Kelly Vidal
*Director of the United States Patent and Trademark Office*